3,326,864
THERMOSET RESIN COMPOSITIONS
Eugene R. Moore and Robert L. Zimmerman, Midland, and Dale M. Pickelman, Auburn, Mich., assignors to The Dow Chemical Company, Midland, Mich., a corporation of Delaware
No Drawing. Filed Feb. 5, 1964, Ser. No. 342,798
11 Claims. (Cl. 260—78.5)

This invention relates to thermoset resin compositions comprising a copolymer of a monovinylidene aromatic compound and an $\alpha,\beta$-unsaturated cyclic anhydride and a polymeric aromatic hydroxyl containing curing agent.

The invention further relates to heat-converted protective and decorative coatings, laminates and moldings of the thermosetting compositions for machines, household appliances, automotive equipment, tools, metal panels and the like.

Vinylidene aromatic compounds which are suitable include, for example, styrene, vinyltoluene, t-butyl styrene, ar-mono- or di-chlorostyrene, $\alpha$-methyl styrene, vinyl xylene and the like.

$\alpha,\beta$-unsaturated dicarboxylic anhydrides which are suitable include, for example, maleic anhydride, phenyl maleic anhydride, chloromaleic anhydride, dichloromaleic anhydride, itaconic anhydride and aconitic anhydride.

The polymeric polyol employed is advantageously a copolymer of two or more vinyl or vinylidene monomers comprising a monovinylidene aromatic compound, as above defined, and one or more unsaturated alcohols such as the monovinyl ether of diethylene glycol, hydroxy ethyl or hydroxy propyl acrylate, allyl alcohol, ethylene glycol monomethacrylate, vinyl alcohol (from polymerized and hydrolyzed vinyl acetate), crotyl alcohol. The polymeric polyol may also be one of the alkylene oxide adducts of phenolic resins, preferably ethylene or propylene oxide adducts of Novalac resins wherein the phenolic nuclei is repeated 4 to 12 times, alkylene oxide adducts of Novalac resins containing p-phenyl phenol or styrene modified phenol, alkylene oxide adducts of melamine formaldehyde or urea formaldehyde resin containing a plurality of methylol groups. The polymeric polyol may also be a polyester resin wherein chains are blocked with excess polyol, e.g., diethanol or triethanolamine blocked polyesters.

The anhydride copolymers of this invention advantageously comprise from 1 to 40 mole percent of the cyclic anhydride. The copolymers containing from 2 to 30 mole percent have particularly good shelf life and water resistance. Those containing 2 to 15 mole percent have particularly good electrical properties and long gel times. The copolymers containing less than 20 mole percent of anhydride are soluble in aromatic solvents, have good color and are very resistant to thermal decomposition. Most advantageously, the copolymers are homogeneous, or essentially homogeneous. Such copolymers are essentially gel-free and transparent and have an essentially uniform composition in each polymer chain. Desirably, the cyclic anhydride content of at least 90 weight percent of the polymer is within a 5 weight percent range, most advantageously within a 2 weight percent range as determined by fractional precipitation analysis. The most preferred copolymers to employ are those having a low molecular weight, i.e., a solution viscosity, 10% in methyl ethyl ketone at 25° C. of less than 1.7, most advantageously less than 0.9.

The polymeric polyol advantageously contains from 1.4 to 38.8 weight percent hydroxyl groups. Most advantageously the average functionality is at least 4 hydroxyls per molecule. Thus, the polyols containing the lower percentages of hydroxyls must be of higher molecular weight in order to prepare the most advantageous products. Polyols containing greater than 3% hydroxyl will have a higher crosslink density and those having less than 20% hydroxyl have particularly good compatibility with the copolymers employed in this invention. The polyols should have a molecular weight of at least 1000, most desirably of at least 1500.

The ratio of hydroxyl to anhydride groups is advantageously between 0.1 and 5, preferably between 0.4 and 2.0 to provide tighter crosslinking. The composition of this invention advantageously is comprised of from 3 to 50 weight percent of the polyol, preferably from 5 to 25 weight percent.

The invention is further illustrated by the following examples wherein all parts are by weight unless otherwise specified.

*Example 1*

86.4 parts of a styrene/maleic anhydride copolymer containing 10.25% by weight of maleic anhydride and having a solution viscosity of 1.28 cps. (10% by weight in methyl ethyl ketone at 25° C.) was mixed with 13.6 parts of a 1600 molecular weight styrene-allyl alcohol copolymer containing 20 weight percent allyl alcohol (about 5 hydroxyl groups per molecule). This mixture was dissolved in acetone to yield a solution containing 60% acetone and 0.5 part tri(dimethylaminomethyl) phenol (DMP 30) per 100 parts resin solids was added as a catalyst. Style 181 glass cloth having a "Volan A" finish was coated with this resin solution. The glass cloth was air dried for about 48 hours, after which the cloth contained about 42% by weight resin solids. The impregnated cloth was cut into 8" by 12" strips stacked twelve high and cured for ½ hour in a press at 350° F. and 200 p.s.i. The resulting laminate had a thickness of 0.109 inch. The initial Barcol hardness was 58. After a 20 minute soak in trichloroethylene the hardness was 56. The laminate gained 0.09 percent weight after 2 hours in boiling water. The flex strength at 72° F. was 57,400 p.s.i. The modulus $\times$ $10^6$ was 2.74. At 160° F. the strength was 54,550 p.s.i. and the modulus $\times$ $10^6$ was 2.81.

*Example 2*

Two hundred parts of the styrene/maleic anhydride copolymer of Example 1 was mixed with 100 parts of the same styrene/20 wt. percent allyl alcohol copolymer for 24 hours in a one-gallon ball mill. The product was a finely divided solid which could be used as a thermo-setting molding powder. The powdered thoroughly mixed product was molded in a compression press at 350° F. for ½ hour to form a ⅛" thick chip. The heat distortion of the chip was 97.6° C. and it was 94.46% insoluble in methyl ethyl ketone. The molding powder so produced has the particular advantage of having an indefinite shelf life.

*Example 3*

A series of laminates was made as described in Example 1, except the ratio of hydroxyl to anhydride groups was 1.0 to 1.0, using polymers of low maleic anhydride content. The properties, listed in Table I, show the advantage of using polymeric polyols of this invention. In particular, the uniquely low dissipation factors at the low anhydride levels of sample No. 4 should be noted.

TABLE I

| Sample No. | Curing Agent | MA Content of the Copolymer | Wt. Percent Curing Agent | Dissipation Factor 10⁶ cps. | Flex Strength (p.s.i.) | |
|---|---|---|---|---|---|---|
| | | | | | 72° F. | 160° F. |
| 1 | Styrene/20% Allyl Alcohol Copolymer | 10.25 | 23.9 | 0.0048 | 64,900 | 44,300 |
| 2 | ----do---- | 8.24 | 20.2 | 0.0044 | 60,600 | 28,970 |
| 3 | ----do---- | 5.89 | 15.25 | 0.0035 | 59,300 | 39,500 |
| 4 | ----do---- | 3.2 | 8.92 | 0.0029 | 44,700 | 31,100 |

*Example 4*

A sample of styrene/10.5% maleic anhydride having a 10 wt. percent solution viscosity in methyl ethyl ketone at 25° C. of 0.701 cps. was mixed with 24.3 parts of the curing agent employed in Example 3 per 160.8 parts S/MA resin on a heated two roll mill. As a catalyst, 1.5 parts per hundred of DMP-30 was added and the polymer was milled for 25 minutes. The rolls were heated with 175° C. steam during this time.

After mixing the sample was cured in a compression press at 350° F. for ½ hour, forming a ⅛″ thick chip of crosslinked polymer. The cured sample had a vicat heat distortion of 104° C. and was found to be 76.9 percent insoluble in methyl ethyl ketone. The insoluble portion swelled in methyl ethyl ketone until it weighed only 3.54 times its dry weight, indicating tight crosslinking.

Similar beneficial results were obtained when employing the monoaddition adduct of propylene oxide to each unit of a Novalac resin having an average of 8 phenolic groups, a polyester of 3 moles phthalic anhydride and 5 moles glycerine having an acid number of <2 mg. KOH per gram resin and a copolymer of vinyl alcohol and styrene containing 12.9 weight percent vinyl alcohol.

Various modifications may be made in the present invention without departing from the spirit or scope thereof, and it is understood that we limit ourselves only as defined in the appended claims.

What is claimed is:

1. Composition consisting of a homogeneous copolymer of a monovinylidene aromatic compound, an α,β-unsaturated cyclic anhydride, the cyclic anhydride content of at least 90 weight percent of the polymer being within a range of 5 weight percent as determined by fractional precipitation analysis, and a polymeric aromatic hydroxyl-containing curing agent which contains from 1.4 to 38.8 weight percent hydroxyl groups, the ratio of hydroxyl to anhydride groups being from 0.1 to 5.0.

2. Composition of claim 1 wherein the copolymer contains from 1 to 40 mole percent of the cyclic anhydride.

3. Composition of claim 1 wherein the copolymer contains from 2 to 30 mole percent of the cyclic anhydride.

4. Composition of claim 1 wherein the copolymer contains from 2 to 15 mole percent of the cyclic anhydride.

5. Composition of claim 1 wherein the aromatic compound is styrene.

6. Composition of claim 1 wherein the cyclic anhydride is maleic anhydride.

7. Composition of claim 1 wheerin the polyol is a polymer of styrene and allyl alcohol.

8. Composition of claim 1 wherein the ratio of hydroxyl to anhydride groups is between 0.4 and 2.0.

9. Composition of claim 1 wherein the polyol comprises from 3 to 50 weight percent, based on the total weight of the composition.

10. Composition of claim 1 wheerin the copolymer has a solution viscosity (10% in methyl ethl ketone at 25° C.) of less than 1.7.

11. Article coated with a tightly adhering cured coating of the composition of claim 1.

References Cited

UNITED STATES PATENTS

| 2,419,880 | 4/1947 | Blyler et al. | 260—874 |
| 2,961,423 | 10/1960 | Chapin | 260—78.5 |
| 3,085,986 | 4/1963 | Muskat | 260—78.5 |
| 3,207,718 | 9/1965 | Zimmerman et al. | 260—78.5 |

JOSEPH L. SCHOFER, *Primary Examiner.*

J. KNIGHT, L. WOLF, L. CHILDERS,
*Assistant Examiners.*